(12) United States Patent
Mallary et al.

(10) Patent No.: US 8,331,051 B2
(45) Date of Patent: *Dec. 11, 2012

(54) DEVICE AND METHOD FOR ERROR DETECTION

(75) Inventors: Michael L. Mallary, Harmony, PA (US);
Mehmet F. Erden, Pittsburgh, PA (US);
Ching He, Allison Park, PA (US);
Venkata S. Chilaka, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/904,912

(22) Filed: Oct. 14, 2010

(65) Prior Publication Data

US 2011/0249355 A1    Oct. 13, 2011

Related U.S. Application Data

(63) Continuation of application No. 11/824,221, filed on Jun. 29, 2007, now Pat. No. 7,835,099.

(51) Int. Cl.
*G11B 5/09* (2006.01)

(52) U.S. Cl. ............... 360/51; 360/31; 369/30.21

(58) Field of Classification Search .............. None
See application file for complete search history.

(56) References Cited

U.S. PATENT DOCUMENTS

| | | |
|---|---|---|
| 5,822,139 A | 10/1998 | Ayabe |
| 6,576,113 B1 | 6/2003 | Scherer et al. |
| 6,738,207 B1 | 5/2004 | Belser et al. |
| 6,754,017 B2 | 6/2004 | Rettner et al. |
| 6,977,108 B2 | 12/2005 | Hieda et al. |
| 6,999,279 B2 | 2/2006 | Lundstrom |
| 7,643,235 B2 | 1/2010 | Erden et al. |
| 7,675,703 B2 | 3/2010 | Albrecht et al. |
| 2002/0034666 A1 | 3/2002 | Kiely |
| 2003/0133213 A1 | 7/2003 | Rubin et al. |
| 2003/0234470 A1 | 12/2003 | Haan et al. |
| 2004/0042105 A1* | 3/2004 | Cho ........................ 360/31 |
| 2005/0157597 A1 | 7/2005 | Sendur et al. |
| 2005/0271819 A1 | 12/2005 | Wago et al. |
| 2006/0126474 A1 | 6/2006 | Hanks |
| 2008/0002269 A1 | 1/2008 | Sakurai et al. |
| 2009/0067078 A1 | 3/2009 | Min et al. |

\* cited by examiner

*Primary Examiner* — Jason Olson
(74) *Attorney, Agent, or Firm* — Mueting, Raasch & Gebhardt, P.A.

(57) ABSTRACT

A disc drive system provides increased reliability by detecting and correcting errors associated with bit-patterned media. Write synchronization errors associated with bit-patterned media are addressed by including data storage for temporarily storing data that is being written to the disc drive. The data is read from both the disc drive and the storage medium and compared to detect write synchronization errors. The disc drive system utilizes the identified write synchronization errors for at least one of timing recovery, equalizer training detection, error correction code application, and error recovery.

17 Claims, 6 Drawing Sheets

DEVICE AND METHOD FOR ERROR DETECTION

CROSS-REFERENCE TO RELATED APPLICATION(S)

This application is a continuation of U.S. patent application Ser. No. 11/824,221, entitled "METHOD AND SYSTEM FOR ERROR CHECKING IN BIT-PATTERNED MEDIA", filed Jun. 29, 2007 by Michael L. Mallary et al.

BACKGROUND

The present invention is related to bit-patterned media, and specifically to a system and method for detecting and correcting errors in writing to bit-patterned media.

In an effort to continue to increase density associated with magnetic media such as disc drives, traditional "continuous" magnetic media have been replaced with "bit-patterned" media. Unlike traditional continuous magnetic media, in which the magnetic material is uniform, bit-patterned media rely on organizing island of magnetic material between areas of non-magnetic material. Each island (commonly referred to as "bit-island") acts as a single grain. The areal density can thereby be increased significantly by reducing the volume of the grain without violating the superparamagnetic limit that constrains the areal density of traditional magnetic media.

Along with their potential to increase areal densities beyond the superparamagnetic limit, bit-patterned media based recording systems present a number of specific problems not previously encountered in conventional magnetic media. In particular, bit-island fabrication errors and write synchronization problems present obstacles to reliable storage using bit-patterned media. In conventional magnetic recording systems, there is no need to synchronize the data with the medium during the write process. For this reason, the data is written using a free running clock and sampling instances are recovered during the read process. However, for bit-patterned media, the locations of the bits to be written are predefined (i.e., the bit islands), and this requires a write clock synchronized to the bit island locations. Any mis-synchronization will lead to deletion or insertion or substitution of bits while writing. In particular, the deletion or insertion of a bit while writing (sometimes referred to as "cycle slip") may result in the loss of all data following the deleted or inserted bit. In addition, fabrication errors can result in individual bit islands that cannot be written to or read from.

SUMMARY

The present invention is a disc drive system having a disc drive that employs bit-patterned media. In one aspect, the system includes a storage media connected to store the user data being written to the disc drive and a data comparator connected to read user data stored to the disc drive and user data stored to the storage media. The data comparator compares user data stored on the disc drive to the user data stored on the storage media to identify write synchronization errors in the data stored to the disc drive. The disc drive system utilizes the identified write synchronization errors for at least one of timing recovery, equalizer training detection, error correction code application, and error recovery.

DETAILED DESCRIPTION

Figure 1:
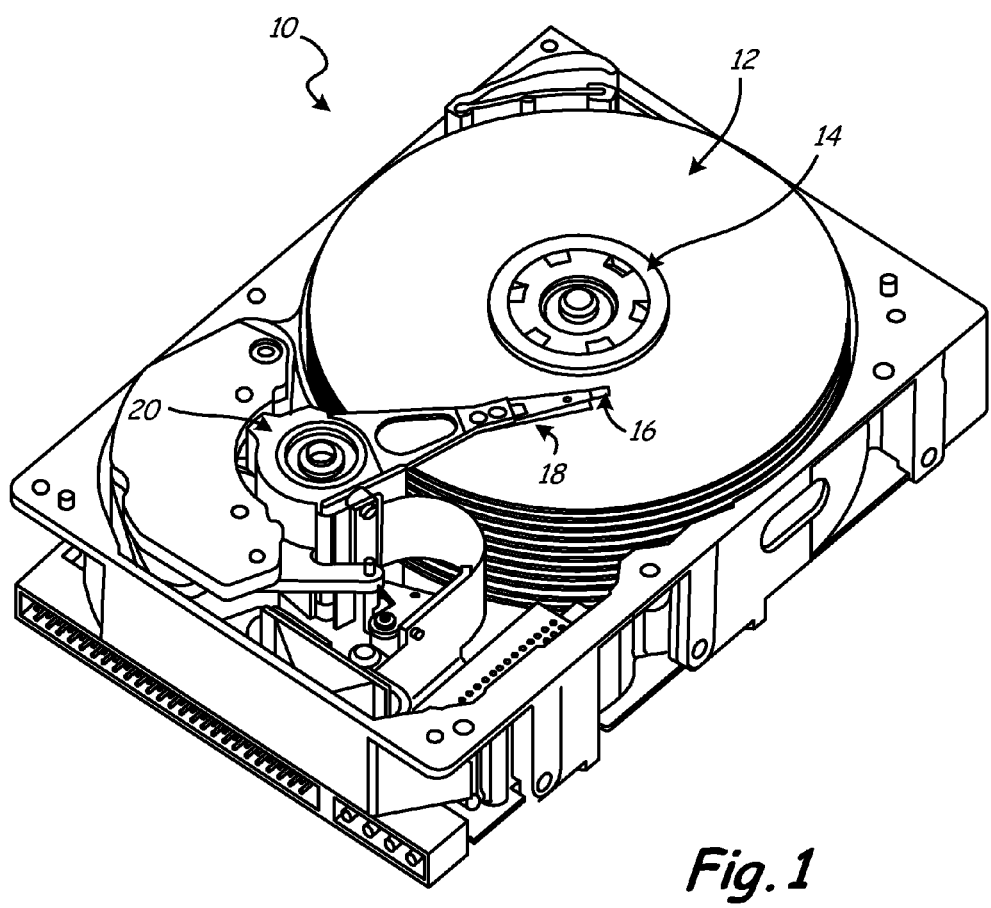
FIG. 1 is a perspective view of a disc drive.

FIG. 1 is a perspective view of disc drive 10, in which an embodiment of the present invention may be employed. Disc drive 10 includes disc pack 12, spindle 14, disc head slider 16, actuator 18, and voice coil motor 20. Disc pack 12 includes one or more individual discs that are fabricated using a lithography process described below with respect to FIGS. 2-5 that organizes individual bit-islands and magnetic media for storage of data, commonly known as "bit-patterned media". Data is written to and read from the individual discs by disc head slider 16, wherein each individual disc would be accompanied by an individual disc head slider. The disc head slider is positioned over individual tracks of each disc by actuator 18 and voice coil motor 20. In this way, as spindle 14 rotates the discs, voice coil motor 20 and actuator 18 position the disc head slider over a desired track, such that data can be written to or read from the disc.

Figure 2A:
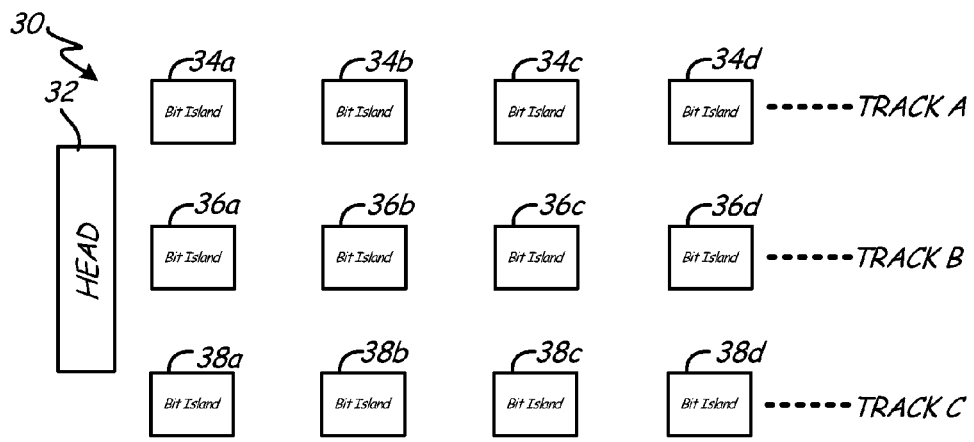
FIGS. 2A and 2B are block diagrams of two embodiments illustrating configurations of bit-patterned media.
Figure 2B:
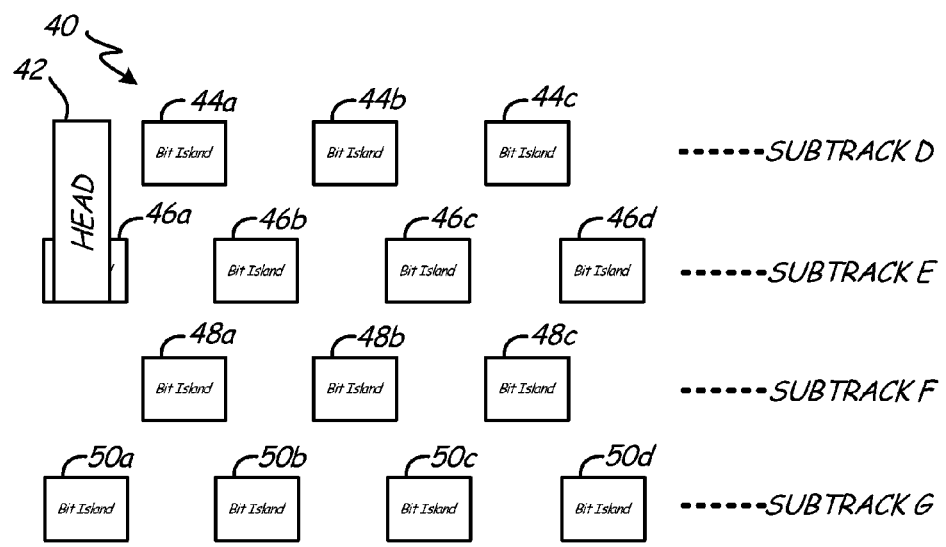

FIGS. 2A and 2B illustrate two possible configurations of bit-islands that may be employed in bit-patterned media. In the embodiment shown in FIG. 2A, bit-patterned media 30 includes a number of bit islands organized into tracks (labeled, track 'A', track 'B' and track 'C'). Read/write head 32 is positioned over one track at a time (for example, in FIG. 2A read/write head 32 is positioned over track 'B'). Each track consists of a number of discrete bit islands organized in grid-like fashion. For instance, track 'A' includes bit islands 34a, 34b, 34c, and 34d, track 'B' includes islands 36a, 36b, 36c, and 36d, and track 'C' includes bit islands 38a, 38b, 38c, and 38d. Writing to a particular bit-island requires not only the correct positioning of read/write head 32 relative to the track being written, but also correct synchronization between the write clock employed by read/write head 32 and the location of the bit-island to be written.

Figure 3:
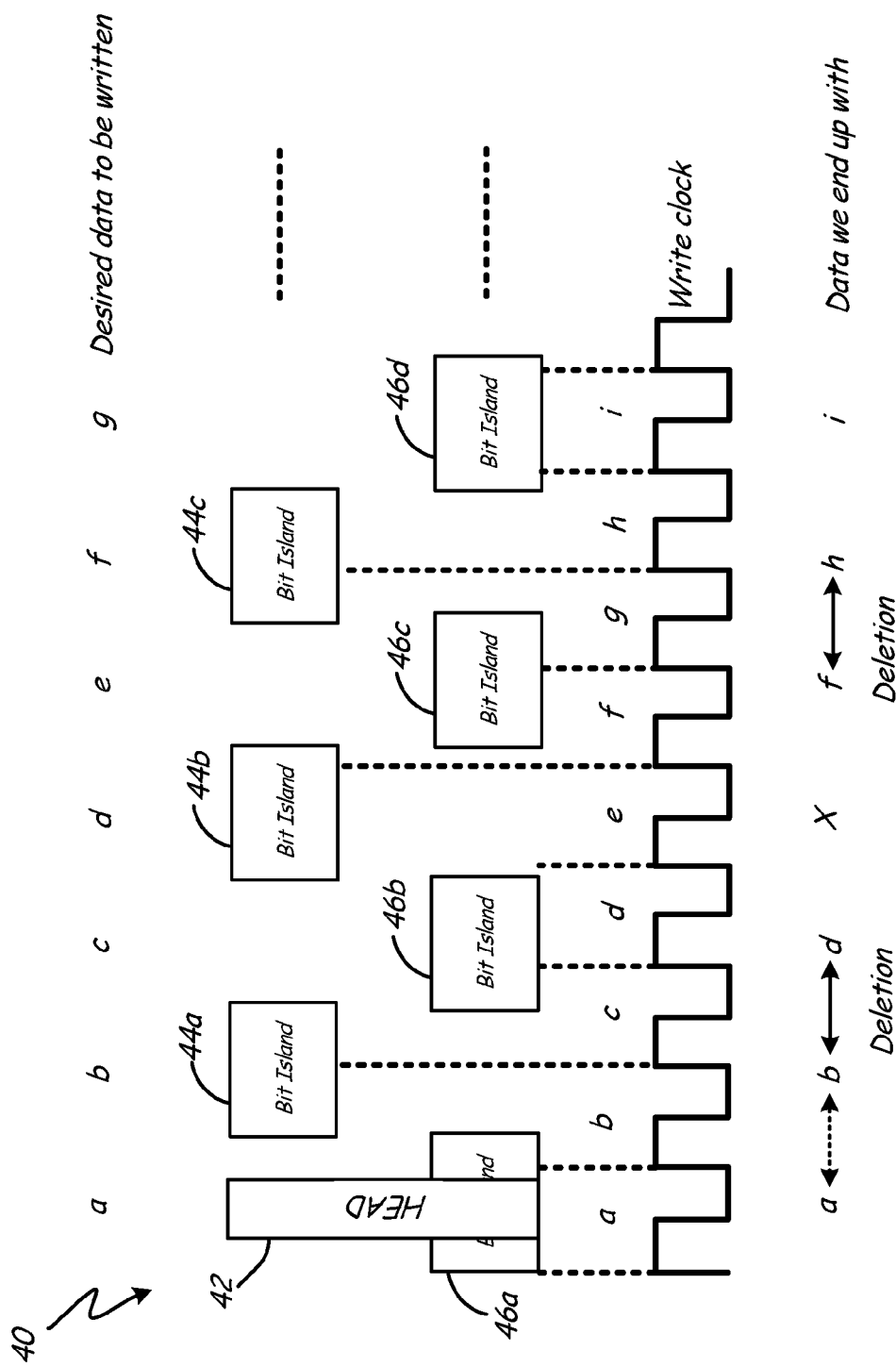
FIG. 3 is a block diagram illustrating write synchronization problems associated with bit-patterned media.

FIG. 2B illustrates another embodiment of the configuration and spacing of bit islands on a bit-patterned media. In this embodiment, bit-patterned media 40 includes a number of bit-islands organized into sub-tracks and track. For instance, bit-islands 44a, 44b, and 44c form a first sub-track, and bit-islands 46a, 46b, 46c, and 46d form a second sub-track. As shown in FIG. 3, reader/writer head 42 is positioned over both sub-track 'D' and sub-track 'E', which together form a single track of data. For example, to write data to the first track, read/writer head 42 would write data to the bit-islands in the following order: 46a, 44a, 46b, 44b, 46c, 44c, and 46d. This configuration of bit-islands is referred to as a staggered island configuration. As discussed in more detail with respect to FIG. 3, in order to successfully write to bit-patterned media 40, read/write head 42 must be correctly positioned over the tracks, and the write signal must be properly synchronized with the location of the bit-islands.

The difference between traditional magnetic media and bit-patterned media is that, unlike in traditional magnetic media, writing to bit-patterned media requires knowledge regarding the location of the bit-islands. As described in more detail with respect to FIG. 3, because each bit-island is discrete, problems can arise when read/write head 42 attempts to write data in between bit-islands. This is in contrast with traditional magnetic media, which due to the continuous nature of the media does not pose this problem.

FIG. 3 uses the staggered bit-island configuration described with respect to FIG. 2B to illustrate in more detail the write synchronization problem that can occur in bit-patterned media. In this embodiment, read/write head 42 is positioned to write a series of data (illustrated by the row of letters 'a', 'b', 'c', 'd', 'e', 'f', and 'g') to bit-islands 46a, 44a, 46b, 44b, 46c, 44c, and 46d respectively. Whether data is written to a particular bit-island depends on whether successive rising edges of the write clock signal (labeled 'Write Clock') correspond with the location of a particular bit-island. In this simplified example, a write to a bit-island is only successful if over half of the distance between the successive rising edges of the write clock correspond with the location of the bit-island to be written.

Therefore, between the first rising edge of the write clock and the second rising edge of the write clock read/write head 42 writes the letter 'a' to a bit-island 46a. Between the second rising edge of the write clock and the third rising edge of the write clock read/write head 42 writes the letter 'b' to bit-island 44a. In this example, even though a portion of the distance between the second and third rising edges occurs over bit-island 46a, a majority of the distance between the second and third rising edges occurs over bit-island 44a, such that bit-island 44a is written with the letter 'b'. Between the third and fourth rising edges of the write clock read/write head 42 writes the letter 'c' to bit-island 46b. Once again, this is because a majority of the distance between the third and fourth rising edges occurs over bit-island 46b.

In the next write cycle, between the fourth and fifth rising edges of the write clock read/write head 42 writes the letter 'd'. However, because a majority of the distance between the fourth and fifth rising edges of the write clock occurs over bit-island 46b, rather than bit-island 44b, the letter 'c' written in the previous write cycle is deleted and replaced with the letter 'd'. This situation is slightly different than the situation in which data is improperly written to a magnetic media (commonly referred to as a "bit-error"). In this case, the letter 'c' has been effectively lost and each successive write will be shifted over such that detection of the deleted bit is difficult. This problem is commonly referred to as "cycle slip" or "write synchronization error". In particular, the devastating aspect of write synchronization errors is that data written after the deletion or insertion of a bit is uncorrectable. This is in contrast with the situation shown in the next write cycle, in which the letter 'e' is not properly written to bit-island 44b. That is, unexpected data 'X' is instead written to bit-island 44b. Therefore, uncorrectable errors refer to those errors caused by write synchronization errors (e.g. insertions, deletions, or substitutions) that cannot be corrected by typical error correcting codes. Traditional error correcting codes (ECC) may be employed to correct errors such as this one. However, ECC and other well-known methods of detecting and correcting errors are typically incapable of handling write synchronization errors.

Figure 4:
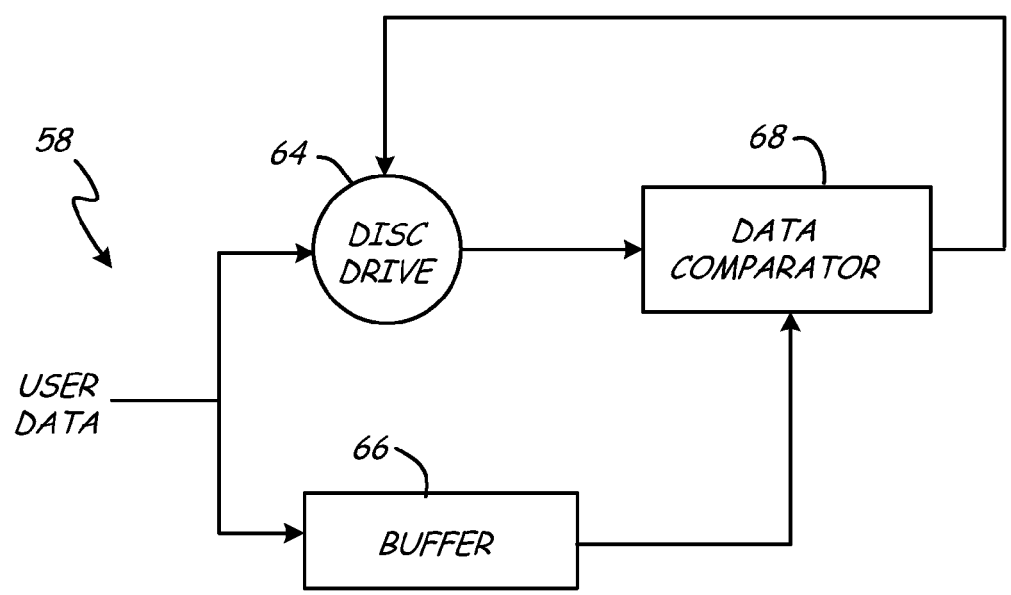
FIG. 4 is a block diagram illustrating an error detection system for use with a bit-patterned media disc drive.

FIG. 4 illustrates an embodiment of a delayed read after write (DRAW) system 58 for detecting write synchronization errors (i.e., the insertion or deletion of bits) and for utilizing the information to increase system reliability. DRAW system 58 includes disc drive 64, buffer 66, and comparator 68.

In this embodiment, user data being written to disc drive 64 is also written to buffer 66. At some time following the write of user data to both disc drive 64 and buffer 66 (i.e, defining this as a delayed read after write system), the user data is read from disc drive 64 and compared to the user data stored in buffer 66 by data comparator 68. As a result of the compare operation, insertion and deletion errors in the user data written to disc drive 64 are detected. In particular, because all of the user data is stored to buffer 66, the type of error detected (insertion, deletion or substitution) and the location of the error can be determined. Data regarding the type of error detected and the location of the detected error can be utilized in a number of ways to improve the reliability associated with writing and reading from disc drive 64. In this way, delayed read after write system 58 prevents serious loss of data caused by write synchronization problems in bit-patterned media (as well as other types of errors that may be encountered).

DRAW system 58 as described above provides for delayed read after write verification of data written to disc drive 64. The term delayed read after write (DRAW) refers to operations in which written data is read, at some time interval (i.e., not real-time) following the write operation, to ensure the write operation was successful. However, requiring all data written to disc drive 64 to be read back to detect errors adds additional latency to disc drive system 58. In one embodiment, adding additional latency to the system is minimized by performing DRAW operations during idle times of disc drive system 58 (i.e., when data is not being written to or requested from disc drive 64). This is referred to as idle read after write (RAW). The ability to maintain system performance by performing IRAW operations depends in part on the size of buffer 66. For example, if the amount of data being written to disc drive 64 is greater than the size of buffer 66, then the write operation will need to be delayed while data is read from disc drive 64 and compared with data stored in buffer 66. After the data written to disc drive 64 has been verified, the data saved to buffer 66 can be removed to make additional space for incoming new data. The size of the buffer is thus an important consideration in designing delayed read after system 58 to ensure that the majority of the operations are performed during idle times. Depending on the embodiment, buffer 66 may be implemented with any number of storage devices, provided the storage devices do not introduce write synchronization problems. For instance, in one embodiment, buffer 66 is implemented with a conventional disc drive, such as a one inch (1") disc drive employing traditional disc drive media. In other embodiments, buffer 66 is implemented with a memory device such as a flash storage device or any number of other memory devices.

Based on the comparison of data stored in buffer 66 and data written to disc drive 64 by data comparator 68, the deletion or insertion of data caused by write synchronization problems can be identified. In particular, the comparison between the data read from disc drive 64 and data stored to buffer 66 allows data comparator 68 to identify the type of write error (e.g., a deletion or an insertion) as well as the location of the write error. This data is then utilized in a number of ways to improve disc drive reliability. In one embodiment, data identifying the type and location of the write errors is then written to disc drive 64. A dedicated region of disc drive 64 may be allocated for storing identified errors or regions on each track may be reserved for storing identified errors. In one embodiment, to ensure the data identifying the type and location of the write errors is written correctly to disc drive 64, this data is also read from disc drive 64 and compared to the data intended to be written to ensure accuracy of the information.

Although data comparator 68 may detect any number of errors regarding the data written to disc drive 64, it is of particular importance to detect insertion and deletion errors associated with write synchronization problems of bit-patterned media. Storing information regarding the type of write synchronization error detected (e.g., insertion or deletion errors) as well as the location of the error provides additional information that can be utilized in a number of ways to improve the operation of disc drive system 58. For example, the information can be utilized for timing recovery, equalizer training detection, error correction code applications, and error recovery modes. The specific utilization of the data for each of these applications depends on the application. In this way, disc drive system 58 is able to detect write synchronization errors. By identifying the write synchronization errors (e.g., insertion or deletion) as well as the location of the errors, this information can be used to improve the reliability of the system.

Figure 5:
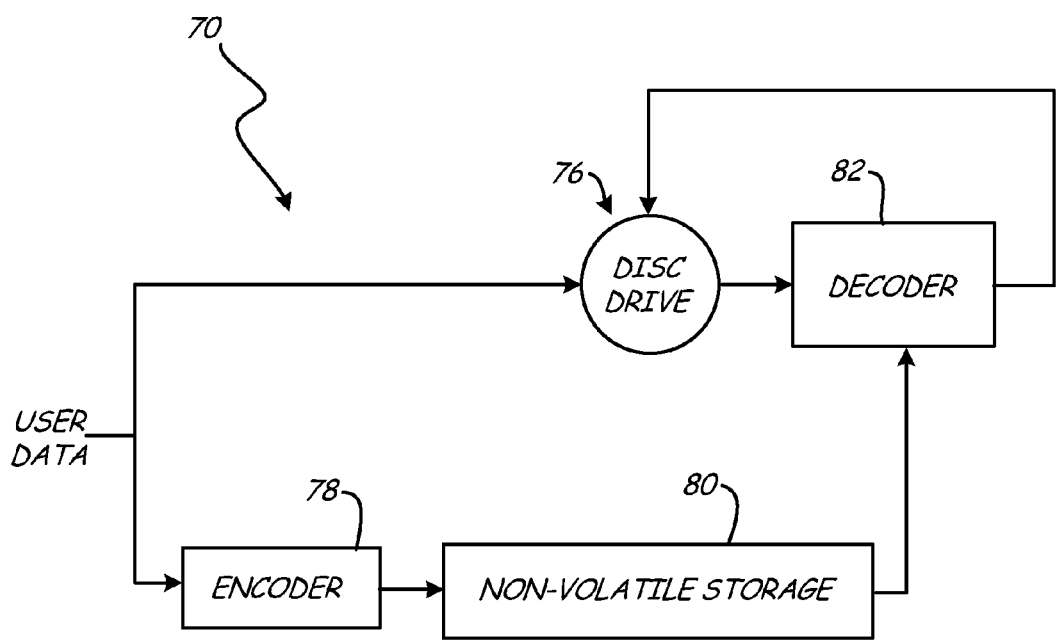
FIG. 5 is a block diagram illustrating a parity-based read after write error detection system for use with a bit-patterned media disc drive.

FIG. 5 illustrates a parity-based delayed read after write (DRAW) system 70 for detecting and correcting errors (including errors caused by write synchronization problems). Parity-based DRAW system 70 includes disc drive 76, encoder 78, non-volatile storage 80, and decoder 82. The system provides a low-cost manner of detecting errors in data written to disc drive 76. The ability of parity-based DRAW system 70 to correct errors detected in disc drive 76 is based on the ability to use the parity string in conjunction with known good data strings to reconstruct the bad data string or strings.

In one embodiment, multiple data strings to be written to disc drive 72 are provided to encoder 78, which uses an encoding scheme to generate a parity string associated with the strings of user data. The parity string is updated based on each string of user data written to disc drive 72, and the updated parity string along with the location or address of the user data string written to the disc drive 72 are stored to non-volatile storage 80. For example, assume the user data in one example consists of three data strings labeled $A_1$, $A_2$, and $A_3$. In this simple example, encoder 78 performs an XOR operation between each incoming string of user data and the parity string A. The net result is that the parity string AP reflects an XOR operation between each string written to disc drive 72 (i.e., $A_1$ XOR $A_2$ XOR $A_3 = A_P$). If a fourth string $A_4$ is written to disc drive 72, then encoder 78 would perform an XOR operation between parity string $A_P$ and string $A_4$ to generate an updated parity string. Thus, the parity string $A_P$ reflects the result of an XOR operation (or equivalent encoding scheme) with respect to all data strings written to disc drive 72. The parity string $A_P$, along with an address identifying the physical location of each string written to disc drive 72 is stored to non-volatile storage 80. As new addresses associated with the new string written to disc drive 76 are continuously added.

At some point in time, either due to potential overflow of data in non-volatile storage 80 as a result of the accumulation of addresses representing the locations of data strings stored on disc drive 76, or due to available idle time of disc drive 76, the strings of user data written to disc drive 76 must be read out. Thus, because user data is read at a time subsequent to the writing of the data, this is a delayed read after write system. This process may be done at one time, with all strings of user data being read from disc drive 76 and provided to decoder 82 along with parity string $A_P$ stored in non-volatile storage 80. Decoder 82 determines whether the user data strings read from disc drive 76 have any uncorrectable errors (in one embodiment, decoder 82 may work in conjunction with error correcting codes (not shown) to make this determination). If a data string is detected with uncorrectable errors, then decoder 82 uses the known good user data strings in conjunction with the parity string received from non-volatile storage 80 to reconstruct the user data. In one embodiment, this would include performing an XOR operation between the known good data strings and the parity string, with the result of the XOR operation being the reconstructed data string. This method is commonly referred to as block-wise processing.

In another embodiment, not all of the data strings must be read at one time. Rather, in this embodiment, data strings may be read from disc drive 76 one at a time, as time permits. For example, assume that data strings $A_1$, $A_2$, and $A_3$ (using the example from above) have been applied to encoder 78 to generate parity string $A_P$, and the data strings were then written to disc drive 76. In this embodiment, rather than read each of the data strings to be verified all at once, decoder 82 can read data strings one at a time and verify whether they are valid (i.e., whether or not they have uncorrectable errors). If the data string does not have any uncorrectable errors (i.e., the string data is OK), then an XOR operation is performed on the string along with the parity string stored in non-volatile storage 80 (e.g., if string $A_1$ is read and does not contain any errors, then perform the operation $A_1$ XOR $A_P$). The parity string is updated as a result of the XOR operation and the address stored in non-volatile storage 80 corresponding to data string $A_1$ can be erased. However, if the data string read from disc drive 76 does include uncorrectable errors (for example, if $A_2$ is read and has uncorrectable errors), then all remaining unread data strings (in this case, data strings $A_3$ and $A_4$) are read and used in conjunction with parity string $A_P$ to reconstruct data string $A_2$. In this case, decoder 82 performs XOR operations between parity string $A_P$ and data strings $A_3$ and $A_4$. The result of this operation is a reconstruction of data string $A_2$. In other words, this simple example of parity DRAW system 70 takes advantage of the principle that as long as only one data string is bad, the other data strings can be used in conjunction with the parity string to reconstruct the data string. Mathematically, this principle can be expressed in terms of XOR operations as follows (using the above example once again, wherein data string $A_2$ represents the uncorrectable data string).

$$A_2 \text{ XOR } A_3 \text{ XOR } A_4 = A_P \rightarrow A_P \text{ XOR } A_3 \text{ XOR } A_4 = A_2$$

In this way, data strings can be recovered using all of the data strings previously stored to disc drive 76 and the parity string. This also illustrates the reason why data strings, after being successfully read and verified (i.e., without uncorrectable errors) from disc drive 76 are XOR'd with the parity string before the physical address associated with the good data string is removed from non-volatile storage 80. If a subsequent string has uncorrectable errors, then only the remaining strings need to be XOR'd with the parity string in order to reconstruct the data string with uncorrectable errors. In addition, if a data string is going to be rewritten with new data, it is important that the data string first be read from disc drive 76 and XOR'd with the parity string in order to ensure the integrity of the parity string.

In addition, this allows data to be read and written in a "sliding window" format in which data strings can be verified one string at a time (in contrast with a block-wise format, in which all data strings would have be read simultaneously in order to check the validity of the stored strings). In this simplified example in which the encoder and decoder schemes involve single pit parity, only one bad string can be tolerated.

If two strings have uncorrectable errors, then decoder 82 will be unable to reconstruct the correct data. However, in other embodiments, more complex encoding and decoding schemes may be employed by encoder 78 and decoder 82, respectively, such that multiple bad strings may be corrected. In particular, by increasing the number of parity bits stored with respect to the data strings, multiple bad strings may be tolerated by the system.

Non-volatile storage 80 may be implemented with a variety of storage mechanisms, including magnetic random access memory (MRAM), flash memory, or other well-known storage media. In addition, the size of non-volatile storage 80 determines, in part, how often time must be allocated to verifying the integrity of data strings written to disc drive 76. Increasing the storage size of non-volatile storage 80 results in a greater number of physical addresses that can be stored with respect to data strings written to disc drive 76. In turn, this allows for the possibility of increased intervals between successive reads of data strings (i.e., if employing the sliding window approach). This, in turn, makes it more likely that idle time associated with disc drive 76 can be found for performing the verification of data strings.

In one embodiment, reconstructed data strings developed by decoder 82 are rewritten to disc drive 76. The rewritten data strings may be provided to encoder 78, to essentially begin the process over again.

Figure 6:
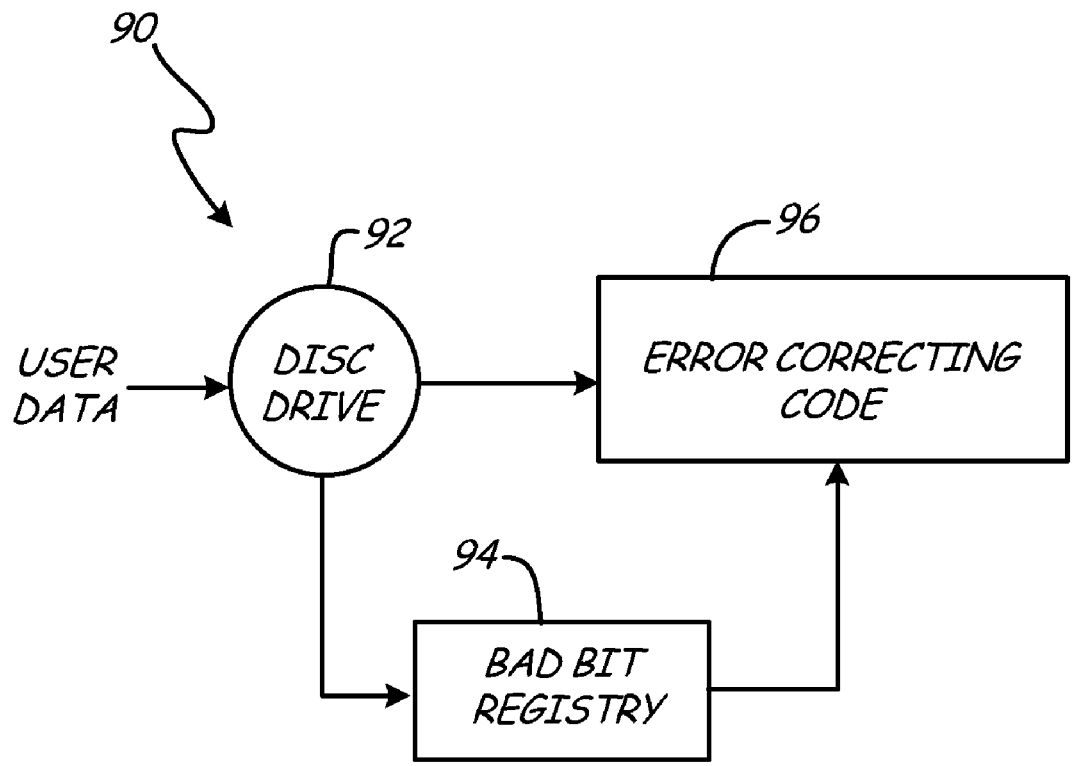
FIG. 6 is a block diagram illustrating a method of detecting bad bit-islands associated with the bit-patterned media.

FIG. 6 illustrates disc drive system 90 that improves reliability associated with bit-patterned media. In particular, disc drive system 90 includes bad-bit registry 94 and error correcting code 96 which work in conjunction with one another to improve reliability of disc drive system 90. As described with respect to FIGS. 2A-3, in addition to write synchronization problems associated with bit-patterned media, problems associated with the fabrication of individual bit-islands (particularly at higher bit densities) may result in particular bit-islands which cannot be written with data. One aspect of error correction codes, such as the Reed-Solomon Error Correction Code, is the greater data correction capability associated with the algorithm if the position of a bit error is known. In particular, Reed-Solomon codes are able to correct twice as many bit errors if the position of the bit-error is known. In this way, bit patterned media is unique in that certain bit locations may be identified due to fabrication errors as prone to errors. Collecting information regarding the location of these errors gives disc drive system 90 a priori information regarding the location of errors which may be used to improve additional errors and thereby improve the overall reliability of the system.

In one embodiment, disc drive system 90 includes disc drive 90, bad-bit registry 94 and error-correcting code 96. In this embodiment, disc drive 92 is implemented as a bit-patterned media, including a number of individual bit-islands. Due to fabrication defects, one or more of the bit-islands may result in errors. Bad-bit registry 94 stores the location of each defective bit-island and makes this information available to error correction code 96. Error correction code 96 may consist of both software and hardware components and may be organized in a hierarchy of levels. A first level of error correction hierarchy may make use of a fast, efficient algorithm for correcting routine bit-errors. Additional hierarchies may be employed to provide additional error correction capabilities if initial efforts at error correction fail. Knowledge of the location of bad bits provided by bad bit registry 94 may be utilized at any point in the hierarchy of error correction code, but will likely most efficiently be used at higher levels if initial attempts at error correction fail. Therefore, in one embodiment if initial attempts at correcting data read from a certain code will access bad bit registry 94 to determine whether the physical addresses read from disc drive 92 correspond with any known bad bits. If so, then the location of bad bits can be used to improve the error correction algorithm employed by error correcting code 96.

The location of bad-bit registry 94 and the type of storage media used to implement bad-bit registry 94 varies depending on the application. In one embodiment, bad-bit registry is located on disc drive 92. In particular, bad-bit registry may be efficiently stored on disc drive 92 by including on each track addresses identifying bad-bits located on that particular track. This reduces the number of bits needed to store the address associated with the bad bits, and prevents the read/write head from having to perform a seek operation to read data from a bad-bit registry located on another track. For example, a track containing 12 megabits (Mbs) of data would require a bit address of twenty-four bits to identify the location of a bad bit. The overhead associated with storing the location of bad bits would be equal to approximately 2.4% of the available storage space for a bad bit rate of 0.1%. Obviously the lower the bad bit rate, the lower the overhead required to store the location of bad bits.

In the embodiment in which individual tracks are used to store addresses associated bad-bits, then an overflow of track may also be used to store the locations of additional bad bits. For example, every thousandth track may be designated as an overflow track. In this way, the position of the track including the bad bit relative to the overflow track may be used to identify the bad bit. In the event the overflow track overflows with the locations of bad bits, then the system could default to storing the full address associated with bad bits in a default bad bit directory.

There are a number of methods or criteria that may be used to identify those bits that are classified as bad bits and whose location should be stored to bad-bit registry 94. In one embodiment, all data locations are written and read. Those bits that result in errors would then be reexamined to determine whether they will repeatedly result in errors. In the alternative, rather than test every bit location prior to deployment of the disc drive, the factory could test a first portion of the disc drive, and then after delivery of the disc drive, the disc drive itself could continue testing during idle times. This would provide the disc drive with a head start on testing all bits. The remainder of the bit locations could be tested during idle times associated with the disc drive. Data is usually written to the disc drive sequentially, so testing a first block of addresses prior to installation may be sufficient and less time intensive.

Although the present invention has been described with reference to preferred embodiments, workers skilled in the art will recognize that changes may be made in form and detail without departing from the spirit and scope of the invention.

The invention claimed is:

1. A disc drive system comprising:
    a disc drive employing bit-patterned magnetic media having a plurality of bit-islands for storing user data;
    a data storage device connected to store the user data being written to the disc drive; and
    a data comparator connected to read user data stored to the disc drive and user data stored to the data storage device, wherein the data comparator compares user data stored on the disc drive to the user data stored on the data storage device to identify write synchronization errors in the data stored to the disc drive, wherein the disc drive utilizes the identified write synchronization errors for at least one of timing recovery, equalizer training detection, error correction code application, and error recovery.

2. The disc drive system of claim 1, wherein the data comparator reads user data stored to the disc drive and user data stored to the data storage device at a time subsequent to the writing of the user data stored to the disc drive and to the data storage device to provide delayed read after write (DRAW) error detection.

3. The disc drive system of claim 1, wherein the data comparator reads user data stored to tire disc drive and user data stored to the data storage device during idle times of the disc drive system when data is not being written to or requested from the disc drive system to provide idle read after write (IRAW) error detection.

4. The disc drive system of claim 1, wherein user data written to the data storage device is erased from the data storage device subsequent to the comparison of the user data stored on the disc drive to the user data stored on the data storage device by tire data comparator.

5. The disc drive system of claim 1, wherein the write synchronization errors detected by the data comparator include insertion errors, deletion errors, and substitution errors.

6. The disc drive system of claim 1, wherein the disc drive includes a dedicated region allocated for storing error data representing both a type of error identified and location corresponding to an identified error.

7. The disc drive system of claim 1, wherein the disc drive includes dedicated portions of each track for storing error data associated with that track, wherein the error data represents both a type of error identified and location corresponding to an identified error on the same track.

8. A method of detecting write synchronization errors, the method comprising:
storing user data to a disc drive employing bit-patterned media;
storing user data written to the disc drive to a data storage device;
comparing the user data stored to the disc drive to the user data stored to the data storage device;
identifying write synchronization errors in the data stored to the disc drive; and
utilizing the identified write synchronization errors for at least one of timing recovery, equalizer training detection, error correction code application, and error recovery.

9. The method of claim 8, further including: storing error data representing both a type of error identified and a location of the identified error.

10. The method of claim 9, wherein storing the error data representing both the type of error identified and location. of the identified error includes storing the identified error to the disc drive.

11. A disc drive system comprising:
a disc drive having a plurality of bit-islands for storing user data;
a data storage device connected to store the user data being written to the disc drive; and
a data comparator connected to read user data stored to the disc drive and user data stored to the data storage device, wherein the data comparator compares user data stored on the disc drive to the user data stored on the data storage device to identify write synchronization errors in the data stored to the disc drive, wherein the disc drive utilizes the identified write synchronization errors for at least one of timing recovery, equalizer training detection, error correction code application, and error recovery.

12. A method of detecting write synchronization errors, the method comprising:
storing user data. to a disc drive;
storing user data written to the disc drive to a data storage device;
comparing the user data stored to the disc drive to the user data stored to the data storage device;
identifying write synchronization errors in the data stored to the disc drive; and utilizing the identified write synchronization errors for at least one of timing recovery, equalizer training detection, error correction code application, and error recovery.

13. A disc drive system comprising:
a disc drive having a plurality of bit-islands for storing user data;
a data storage device connected to store the user data being written to the disc drive; and
a data comparator connected to read user data stored to the disc drive and user data stored to the data storage device, wherein the data comparator compares user data stored on the disc drive to the user data stored on the data storage device to identify write synchronization errors in the data stored to the disc drive and stores error data representing both a type of error identified and location corresponding to the identified error.

14. A disc drive system comprising:
a disc drive for storing user data;
an encoder that generates a parity string based on data strings written to the disc drive;
a non-volatile storage for storing addresses identifying the location of data strings stored to the disc drive and for storing the parity string generated by the encoder;
a decoder that at a time subsequent to data strings being written to the disc drive reads data strings from the disc drive and determines whether they have uncorrectable errors, wherein if the data string has an uncorrectable error then the parity string and other data strings written to the disc drive are used in conjunction with a decoder algorithm to reconstruct the data string with the uncorrectable error.

15. A disc drive system comprising:
a disc drive;
a bad-bit registry for storing addresses identifying defective bits within the disc drive; and
an error correction device that accesses the bad-bit registry and utilizes the data identifying the location of bad bits to improve error correcting capabilities.

16. A method of providing error checking, the method comprising:
storing user data to a disc drive;
storing user data written to the disc drive to a data storage device;
comparing the user data stored to the disc drive to the user data stored to the data storage device;
identifying write synchronization errors in the data stored to the disc drive; and
storing error data representing both a type of error identified and a location of the identified error.

17. A method of providing error checking, the method comprising:
storing user data strings to a disc drive;
applying an encoder algorithm to the user data strings written to the disc drive to generate a parity string;

storing addresses identifying the location of the used data strings stored to the disc drive and the parity string generated by the encoder algorithm to a non-volatile storage;

reading the user data strings stored in the disc drive;

determining whether the user data strings read from the disc drive contain uncorrectable errors; and reconstructing the user data string by applying a decoder algorithm to the parity string and other data strings stored to the disc drive if the user data string read from the disc drive is determined to have uncorrectable errors.

* * * * *